(12) United States Patent
Kawasaki

(10) Patent No.: US 10,176,348 B2
(45) Date of Patent: Jan. 8, 2019

(54) TAG ACCESS APPARATUS

(71) Applicant: FUJITSU FRONTECH LIMITED, Inagi-shi, Tokyo (JP)

(72) Inventor: Yusuke Kawasaki, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 386 days.

(21) Appl. No.: 14/290,254

(22) Filed: May 29, 2014

(65) Prior Publication Data

US 2014/0266628 A1 Sep. 18, 2014

Related U.S. Application Data

(63) Continuation of application No. PCT/JP2012/077751, filed on Oct. 26, 2012.

(51) Int. Cl.
| | |
|---|---|
| *G06K 7/10* | (2006.01) |
| *H01Q 11/08* | (2006.01) |
| *H01Q 1/22* | (2006.01) |
| *H01Q 21/06* | (2006.01) |
| *H01Q 17/00* | (2006.01) |

(52) U.S. Cl.
CPC ....... *G06K 7/10356* (2013.01); *H01Q 1/2216* (2013.01); *H01Q 11/08* (2013.01); *H01Q 17/00* (2013.01); *H01Q 21/067* (2013.01)

(58) Field of Classification Search
CPC .................. G06Q 10/087; G06Q 20/3278
USPC ....................................... 340/10.1
See application file for complete search history.

(56) References Cited

U.S. PATENT DOCUMENTS

| | | | |
|---|---|---|---|
| 2004/0004581 A1* | 1/2004 | Jenwatanavet | H01Q 5/357 343/895 |
| 2006/0202800 A1* | 9/2006 | Ohashi | G06K 7/0008 340/10.1 |
| 2007/0008228 A1* | 1/2007 | Yamada | H01Q 1/2225 343/702 |
| 2012/0019364 A1* | 1/2012 | Reichenbach | G06K 7/10079 340/10.1 |

FOREIGN PATENT DOCUMENTS

| | | |
|---|---|---|
| CN | 1897354 A | 1/2007 |
| CN | 102474014 A | 5/2012 |

(Continued)

OTHER PUBLICATIONS

Office Action dated Apr. 1, 2016, issued in counterpart Chinese Patent Application No. 201280067516.7, with English translation. (9 pages).

(Continued)

*Primary Examiner* — Vernal Brown
(74) *Attorney, Agent, or Firm* — Westerman, Hattori, Daniels & Adrian, LLP

(57) ABSTRACT

A tag access apparatus accesses an RFID tag provided with a first antenna having a radio wave directivity along a longitudinal direction of a plurality of test tubes arranged at a predetermined interval. The tag access apparatus has a multi-filler helical antenna which is provided in a direction opposite to the radio wave directivity of the first antenna and which maintains an electric field strength at a central part of the multi-filler helical antenna at a level that allows access to the RFID tag, at the time of access to the RFID tag.

5 Claims, 9 Drawing Sheets

(56) References Cited

FOREIGN PATENT DOCUMENTS

| | | |
|---|---|---|
| EP | 1 710 729 A1 | 10/2006 |
| GB | 2471578 A | 1/2011 |
| JP | 09-130112 A | 5/1997 |
| JP | 2005-009863 A | 1/2005 |
| JP | 2006-030035 A | 2/2006 |
| JP | 2007-108982 A | 4/2007 |
| JP | 2010-154012 A | 7/2010 |
| JP | 2012-231357 A | 11/2012 |
| WO | 2006/077645 A1 | 7/2006 |

OTHER PUBLICATIONS

Extended European Search Report dated Sep. 11, 2015, issued in counterpart European Patent Application No. 12886999.7 (7 pages).
International Search Report, dated Jan. 29, 2013, issued in corresponding application No. PCT/JP2012/077751.
Office Action dated Jun. 16, 2017, issued in counterpart Chinese Patent Application No. 201280067516.7, with English translation. (15 pages).

\* cited by examiner

TAG ACCESS APPARATUS

CROSS-REFERENCE TO RELATED APPLICATION

This application is a continuation application of International Application PCT/JP2012/077751 filed on Oct. 26, 2012 which designated the U.S., the entire contents of which are incorporated herein by reference.

FIELD

The embodiments discussed herein relate to a tag access apparatus.

BACKGROUND

There is known a technique of attaching an RFID (Radio Frequency IDentification) tag to a sample container such as a test tube containing a sample, and using an antenna which reads the RFID tag to read information stored in the RFID tag or store information in the RFID tag.

It is known that a radio wave may be absorbed by the sample or surrounding substance, depending on a radio wave frequency, which may lead to decreased accuracy of reading or writing information from or to the RFID tag.

International Publication Pamphlet No. WO2006/077645

Since the electric field of a patch antenna generally used for reading an RFID tag is not uniform, there has been a problem that reading or writing information simultaneously from or to each of RFID tags attached to a plurality of sample containers may cause read or write errors in some of the sample containers. Therefore, the number of readings or writings has been limited to about 50 when reading from or writing to a plurality of tags. In addition, a non-uniform electric field prevents stable reading or writing, and therefore the sample containers needed to be moved in the course of reading or writing in order to pass an electric field that allows reading or writing through the sample containers.

SUMMARY

According to one aspect, there is provided a tag access apparatus which accesses an RFID tag which is provided on the side surface of each of a plurality of containers arranged at a predetermined interval and which is provided with a first antenna having a radio wave directivity that is high in a vertical direction, which is parallel to the longitudinal direction of the side surface of the container. The tag access apparatus includes a second antenna which is positioned to face a direction of the radio wave directivity of the first antenna and which maintains an electric field strength at the central part of the second antenna at a level that allows access to the RFID tag, at the time of access to the RFID tag, and collectively reads a plurality of RFID tags.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the following, a tag access apparatus of an embodiment will be described in detail with reference to the drawings.

Figure 1:
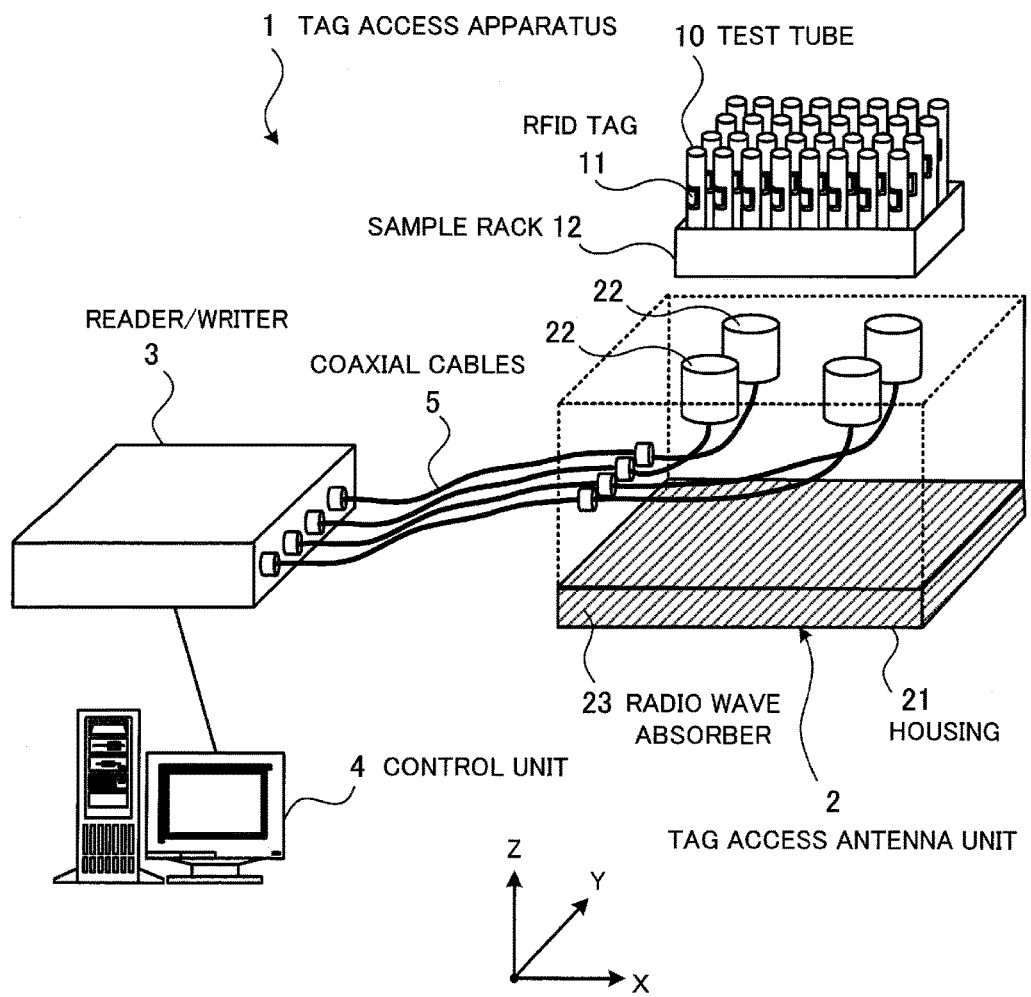
FIG. 1 illustrates a tag access apparatus of an embodiment.

FIG. 1 illustrates the tag access apparatus of the embodiment.

A tag access apparatus 1 of the first embodiment has a tag access antenna unit 2 and a reader/writer 3.

The tag access antenna unit 2 generates an electric field according to an instruction of the reader/writer 3, and accesses RFID tags 11 respectively attached to a plurality of test tubes 10. Here, the test tubes 10 are exemplary sample containers. Each of the test tubes 10 contains a sample such as blood, for example. The maximum radius of each of the test tubes 10 is about 12 mm, for example.

Each of the test tubes 10 is contained in a sample rack 12. The sample rack 12 holds the plurality of test tubes 10 in a manner arranged at a predetermined interval (e.g., the inter-central interval of the test tubes being 20 mm). The sample rack 12 is supported by a supporting mechanism (not illustrated).

The tag access antenna unit 2 has a housing 21, four multi-filler helical antennas 22 attached to the housing 21, and a radio wave absorber 23. In FIG. 1, the housing 21 is illustrated by a dotted line, the inside of the housing 21 being illustrated transparently.

The bottom surface of the housing 21 is formed by a metal plate such as copper. The side and the top surfaces of the housing 21 are formed by an insulation member such as plastic, for example. Forming the bottom surface of the housing 21 by a metal plate allows stabilization of the radio property of multi-filler helical antenna 22.

Each of the multi-filler helical antennas 22 is attached to the top surface of the housing 21 with a double-stick tape, for example. The multi-filler helical antennas 22 are attached to the housing 2 at regular intervals (e.g., intervals of 150 to 200 mm) so that electric fields generated thereby overlap with each other. The multi-filler helical antennas 22 are respectively connected to the reader/writer 3 via coaxial cables 5. At the side of the housing 21, there are provided bores allowing the coaxial cables 5 to pass through.

Each of the multi-filler helical antennas 22 has a hybrid (distributor with a 90° phase shifter) at a feeding point forming a circular polarized wave antenna. Accordingly, the accuracy of accessing the RFID tags 11 improves. Each of the multi-filler helical antennas 22 accesses the RFID tags 11 using a UHF band (e.g., a 950 MHz band). Using a UHF band may extend the accessible distance to the RFID tags 11 to be longer than the accessible distance using a 13.56 MHz band.

The radio wave absorber 23 is provided at position opposite to the RFID tags 11 across the multi-filler helical antennas 22. The radio wave absorber 23 is formed by urethane resin containing carbon powder therein, for example.

The reader/writer 3 exchanges various commands with a control unit 4 according to an access request to the RFID tags 11 of the control unit 4. Subsequently, the reader/writer 3 supplies electric power to the multi-filler helical antennas 22, and causes the multi-filler helical antennas 22 to generate an electric field. In addition, the reader/writer 3 transfers, to the control unit 4, information obtained from the RFID tags 11 by generation of the electric field.

The control unit 4 is a unit operated by the user for causing the tag access apparatus 1 to access the RFID tags 11.

Figure 2:
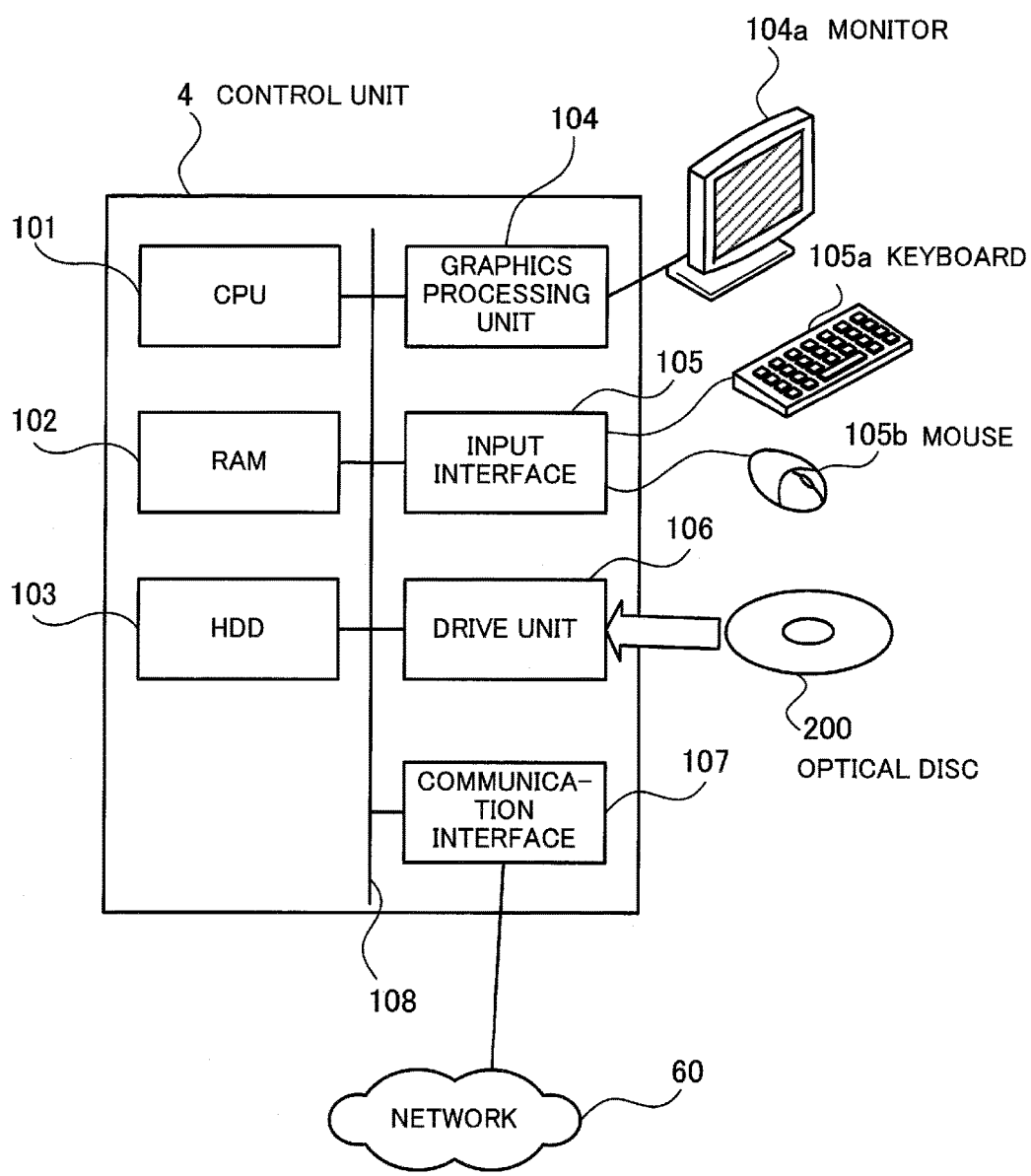
FIG. 2 illustrates an exemplary hardware configuration of a control unit of the embodiment.

FIG. 2 illustrates an exemplary hardware configuration of the control unit of the embodiment.

The control unit 4 is controlled as a whole by a CPU (Central Processing Unit) 101. To the CPU 101, a RAM (Random Access Memory) 102 and a plurality of peripheral devices are connected via a bus 108.

The RAM 102 is used as the main storage unit of the control unit 4. In the RAM 102, an OS (Operating System) program and at least a part of application programs to be executed by the CPU 101 are temporarily stored. In addition, in the RAM 102, various kinds of data to be used for processing by the CPU 101 are stored.

As peripheral devices connected to the bus 108, there are a Hard Disk Drive 103, a graphics processing unit 104, an input interface 105, a drive unit 106, and a communication interface 107.

The Hard Disk Drive 103 magnetically writes or reads data to or from a built-in disk. The Hard Disk Drive 103 is used as a secondary storage unit of the control unit 4. In the Hard Disk Drive 103, an OS program, application programs, and various kinds of data are stored. A semiconductor storage unit such as a flash memory may be used as the secondary storage unit.

To the graphics processing unit 104, a monitor 104a is connected. The graphics processing unit 104 displays an image on the screen of the monitor 104a according to an instruction from the CPU 101. As the monitor 104a, there is cited a CRT (Cathode Ray Tube), a Liquid Crystal Display, or the like.

To the input interface 105, a keyboard 105a and a mouse 105b are connected. The input interface 105 transmits, to the CPU 101, signals sent from the keyboard 105a or the mouse 105b. The mouse 105b is an exemplary pointing device and thus another pointing device may be used. As another pointing device, there is cited a touch panel, a tablet, a touchpad, a track ball, or the like.

The drive unit 106 reads data stored in an optical disc having data stored thereon so as to be readable by reflection of light, or in a portable storage medium such as a USB (Universal Serial Bus) memory, for example. When the drive unit 106 is an optical drive unit, for example, laser beam or the like is used to read data stored in the optical disc 200. As the optical disc 200, there is cited a Blu-ray (registered trademark), a DVD (Digital Versatile Disc), a DVD-RAM (Digital Versatile Disc Random Access Memory), a CD-ROM (Compact Disc Read Only Memory), a CD-R (Compact Disc Recordable)/RW (ReWritable), or the like.

The communication interface 107 is connected to a network 60. The communication interface 107 transmits or receives data to or from another computer or communication device via the network 60.

The hardware configuration described above allows implementation of the processing function of the present embodiment. Next, an RFID tag will be described.

Figure 3:
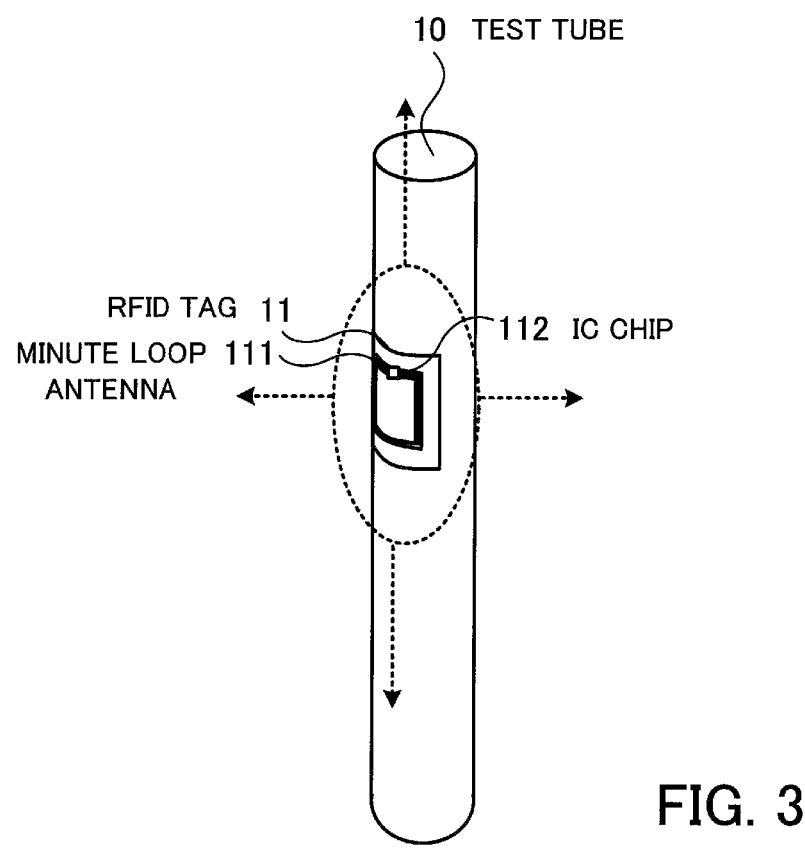
FIG. 3 is an explanatory diagram of an RFID tag.

FIG. 3 is an explanatory diagram of an RFID tag.

An RFID tag 11 is attached to the side of the test tube 10 with a double-stick tape or the like. The RFID tag 11 has a copper-made minute loop antenna 111 forming a loop antenna, and an IC chip 112 having a storage area set therein to store a unique ID and information about the sample contained in the test tube 10, for example. Any other information such as a number or bar-code information may be set in the RFID tag 11. For example, the maximum outer diameter of the minute loop antenna 111 may be 33 mm, the thickness may be 20 μm, and the width of the copper part forming the loop may be 2 mm. In addition, a conductor such as silver or aluminum, besides copper as described above, may be used as the constituent material of the minute loop antenna 111. In FIG. 3, an exemplary radio wave directivity of the minute loop antenna 111 is illustrated by the dotted line. Attaching the RFID tag 11 on the side of the test tube 10 enhances the directivity in the vertical direction, i.e. the longitudinal direction of the test tube 10 compared with the horizontal direction. Therefore, it is possible to reduce the possibility of blocking radio waves by the sample contained in the own test tube 10, by the adjacent test tube 10, or by the sample contained therein. In addition, simply attaching the RFID tag 11 to the side enhances the directivity in the vertical direction, and therefore an existing test tube 10 may be used without having to prepare a special test tube to which the RFID tag 11 is attached. Furthermore, using the RFID tag 11 which has employed the minute loop antenna 111 having a low directivity in the horizontal direction mitigates the adverse effect of the dielectric constant or the like of the substance inside the test tube. Accordingly, it becomes possible to mitigate the adverse effect due to the amount or composition of the sample inside the test tube.

Figure 4:
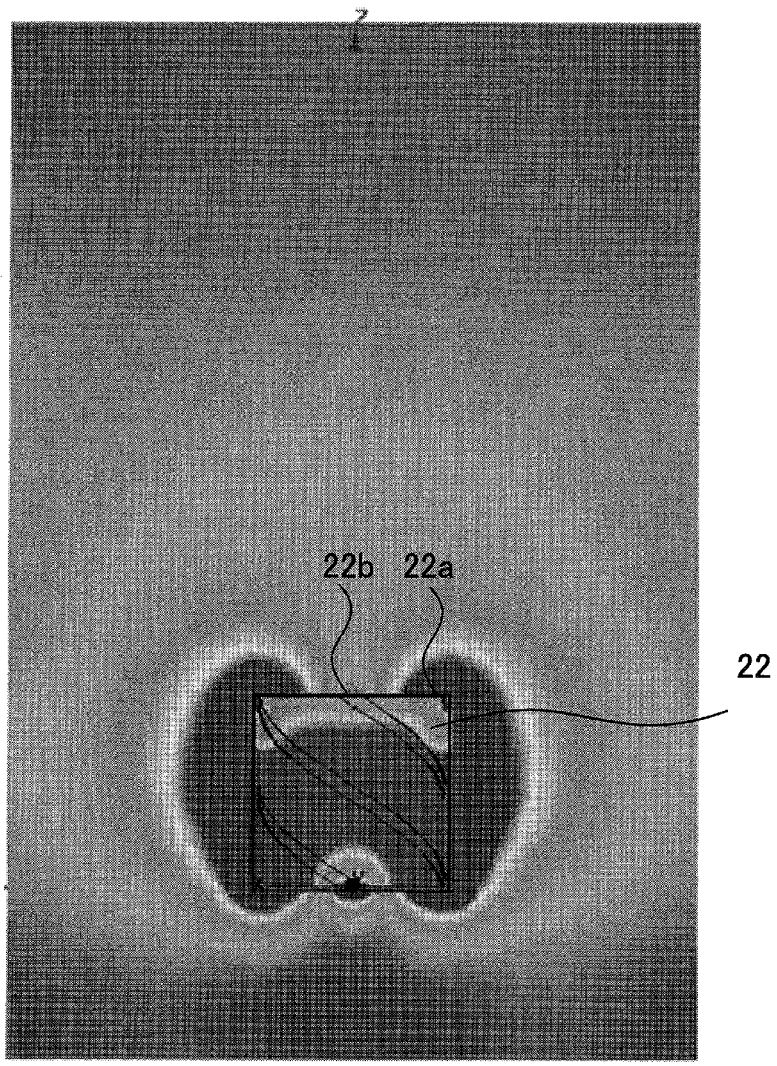
FIG. 4 is an explanatory diagram of a radio emission pattern in the vertical direction of a multi-filler helical antenna.

FIG. 4 is an explanatory diagram of a radio emission pattern in the vertical direction of a multi-filler helical antenna.

A multi-filler helical antenna 22 has less electric field non-uniformity in the vicinity of the multi-filler helical antenna 22 than a patch antenna or the like, and also may secure a wide radio emitting surface.

FIG. 4 illustrates an emission pattern of the radio wave generated by the multi-filler helical antenna 22 when accessing the RFID tag 11. The electric field strength at the end 22a of the multi-filler helical antenna 22 is 5.0000e+002 (V/m), for example. In addition, the electric field strength at a central part 22b of the multi-filler helical antenna 22 is 1.4266e+002 (V/m), for example. The electric field strength at the central part 22a allows access to the RFID tag 11 placed over the multi-filler helical antenna 22.

Figure 5:
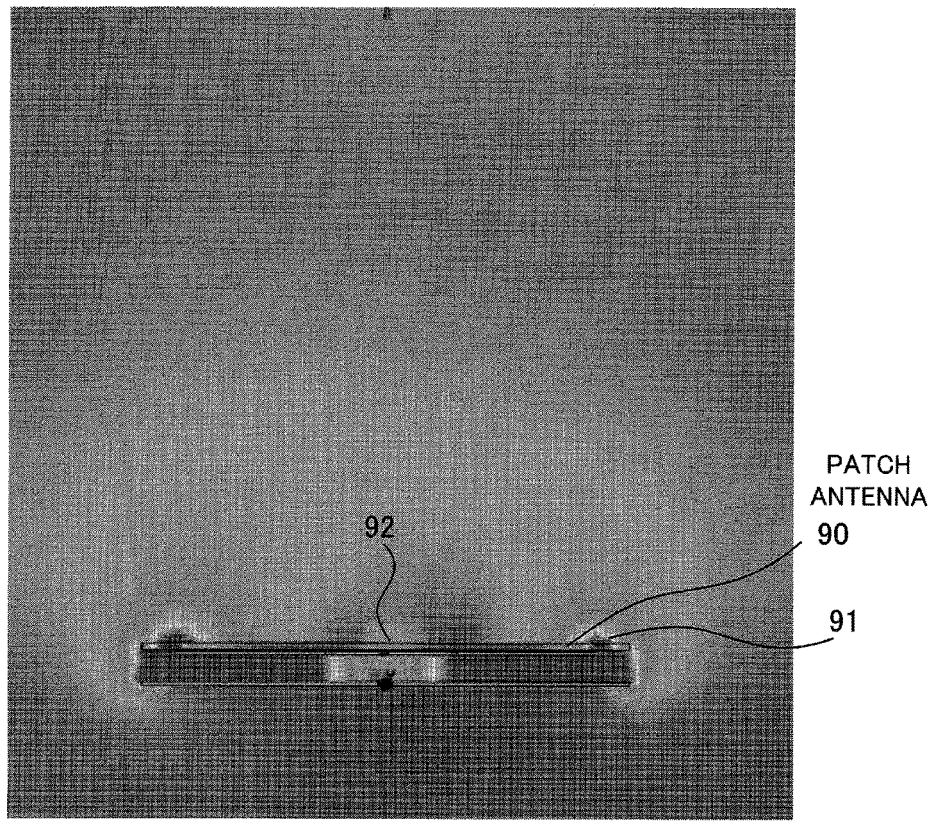
FIG. 5 is an explanatory diagram of a radio emission pattern in the vertical direction of a patch antenna.

FIG. 5 is an explanatory diagram of a radio emission pattern in the vertical direction of a patch antenna. FIG. 5 illustrates an emission pattern of the radio wave generated by a patch antenna 90 prepared as a comparative example. Since the center of the patch antenna 90 is located at the λ/2 point in terms of structure, the electric field strength weakens. For example, the electric field strength at a central part 92 of the patch antenna is about 7.1429e+001 (V/m) whereas the electric field strength at the end 91 of the patch antenna 90 is about 5.0000e+002 (V/m). With the electric field strength at the central part 92, the RFID tag 11 disposed at the central part of the patch antenna 90 no longer responds and the possibility of occurrence of an access error becomes higher in comparison with the multi-filler helical antenna 22.

As illustrated in FIGS. 4 and 5, the electric field strength at the central part 22b of the multi-filler helical antenna 22 becomes larger than the electric field strength at the central part 92 of the patch antenna.

Figure 6A:
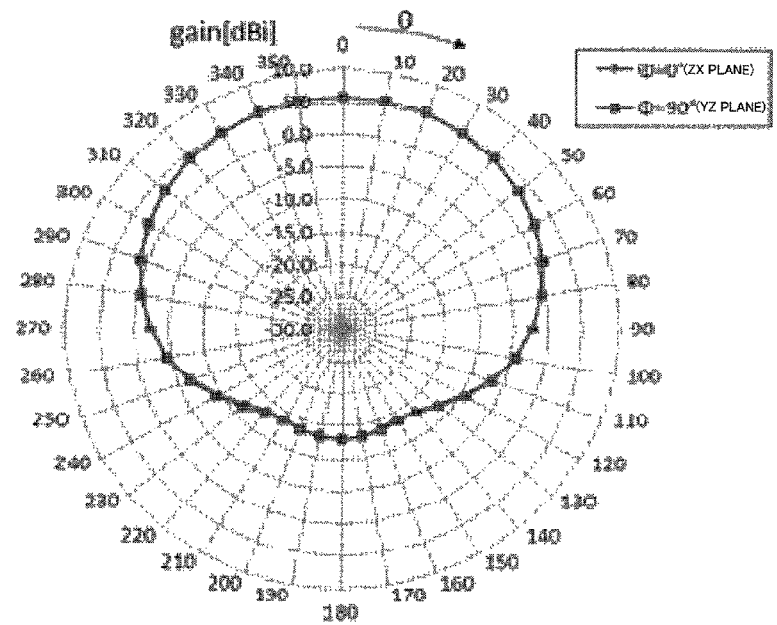
FIGS. 6A and 6B are explanatory diagrams of a radio emission pattern in the horizontal direction of the multi-filler helical antenna.
Figure 6B:
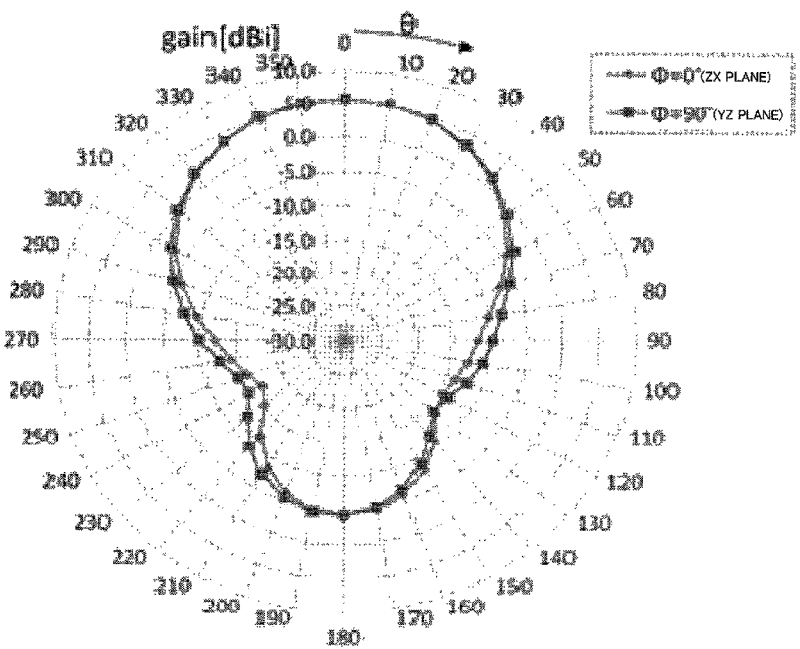

FIGS. 6A and 6B are explanatory diagrams of a radio emission pattern in the horizontal direction of a multi-filler helical antenna.

FIG. 6A illustrates a radio emission pattern in the horizontal direction of a multi-filler helical antenna, and FIG. 6B illustrates a radio emission pattern in the horizontal direction of a patch antenna.

Here, the radio wave range of the multi-filler helical antenna is wider than that of the patch antenna. Therefore, accessing the RFID tag 11, with the RFID tag 11 disposed over the multi-filler helical antenna 22, may increase the possibility of avoiding an access error in comparison to accessing the RFID tag 11 using a patch antenna or the like.

In addition, it is possible to easily cope with the change of the number of RFID tags 11 to be accessed, by preparing multi-filler helical antennas 22 in the number corresponding to the number of the RFID tags 11 to be accessed, or changing the number of multi-filler helical antennas 22 to be operated.

Next, a method of accessing the RFID tag 11 using the tag access apparatus 1 will be described.

When accessing each of the RFID tags 11 using the tag access apparatus 1, a user of the tag access apparatus 1 operates a supporting mechanism to position a sample rack 12 above the tag access antenna unit 2. In this occasion, the sample rack 12 may be placed on the housing 21, or may be disposed at a position separated from the housing 21 by a predetermined distance.

With the sample rack 12 positioned above the tag access antenna unit 2, the user, while watching the monitor 104a, operates the mouse 105b or the like connected to the control unit 4 to activate a tag access application stored in the HDD 103. The tag access application may be preliminarily activated. Upon activation of the tag access application, buttons for starting data read and data write are displayed on the monitor 104a, for example. The user operation of the mouse 105b or the like to press the data read start button displayed on the monitor 104a causes the control unit 4 to control the reader/writer 3 to start reading data stored in the RFID tag 11. In addition, pressing the data write start button causes the control unit 4 to control the reader/writer 3 to start writing data to the RFID tag 11.

Next, a method of controlling the reader/writer 3 of the control unit 4 will be described.

Figure 7:
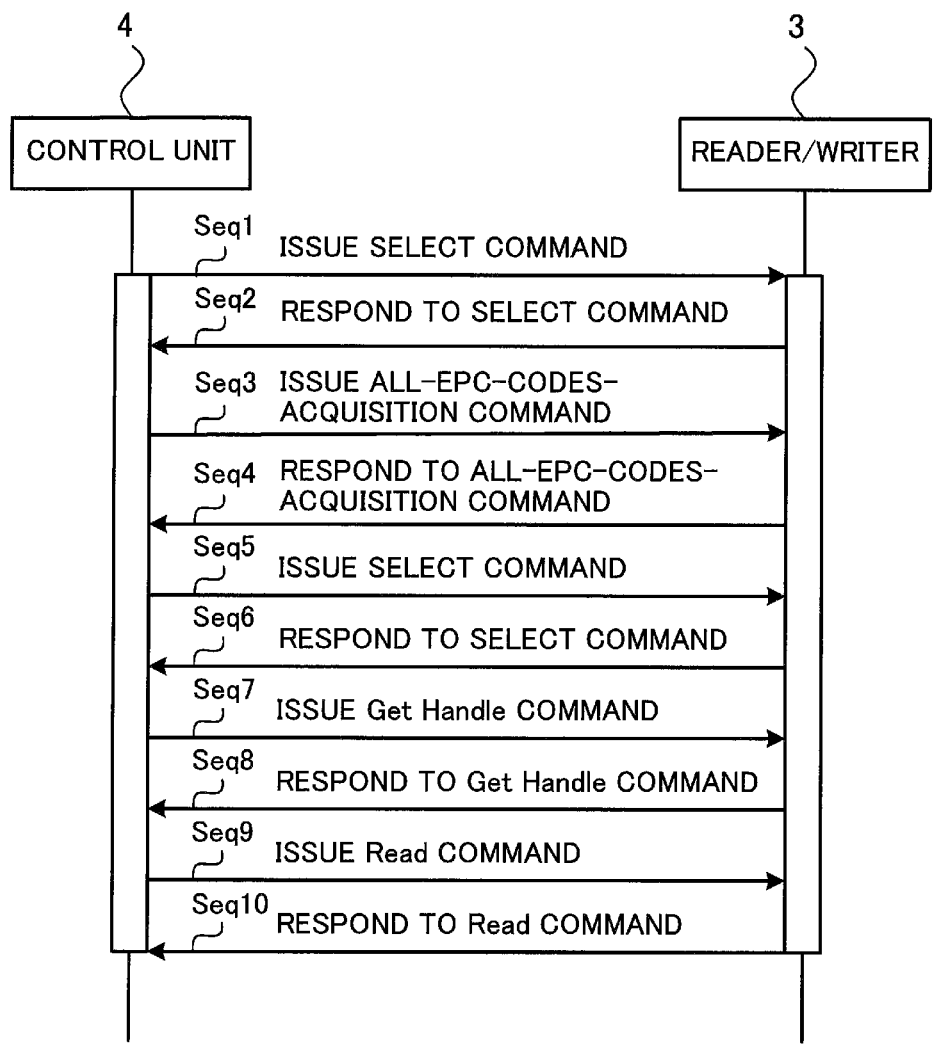
FIG. 7 is a sequence chart illustrating a procedure of a control unit when reading data stored in an RFID tag.

FIG. 7 is a sequence chart illustrating a procedure of the control unit when reading data stored in an RFID tag.

[Sequence Seq1] The control unit 4 issues, to the reader/writer 3, a select command for identifying the RFID tag 11 to be read.

[Sequence Seq2] The reader/writer 3 responds to the control unit 4 in response to the select command.

[Sequence Seq3] The control unit 4 issues an all-EPC-codes-acquisition command to the reader/writer 3.

[Sequence Seq4] In response to the all-EPC-codes-acquisition command, the reader/writer 3 causes each of the multi-filler helical antennas 22 to generate an electric field. The reader/writer 3 returns identification information of all the RFID tags 11 read by each of the multi-filler helical antennas 22 to the control unit 4.

[Sequence Seq5] The control unit 4 issues, to the reader/writer 3, a select command for specifying identification information of an RFID tag 11 to be read, from the identification information of the RFID tags 11 received in the sequence Seq4.

[Sequence Seq6] The reader/writer 3 responds to the control unit 4 with the RFID tag 11 according to the select command.

[Sequence Seq7] The control unit 4 issues, to the reader/writer 3, a Get Handle command for specifying a Handle of the RFID tag 11 specified in the sequence Seq5.

[Sequence Seq8] In response to the Get Handle command, the reader/writer 3 identifies a Handle in the RFID tag 11 specified in the sequence Seq5. The reader/writer 3 then returns the identified Handle to the control unit 4. Here, the Handle is, for example, a 16-bit random code. Thereafter, the RFID tag 11 with the identified Handle is uniquely identified by the Handle.

[Sequence Seq9] The control unit 4 issues, to the reader/writer 3, a Read command requesting to read information in the RFID tag 11 with the identified Handle.

[Sequence Seq10] The reader/writer 3 reads information in the RFID tag 11 in response to the Read command, and returns a Read command response to the control unit 4.

Figure 8:
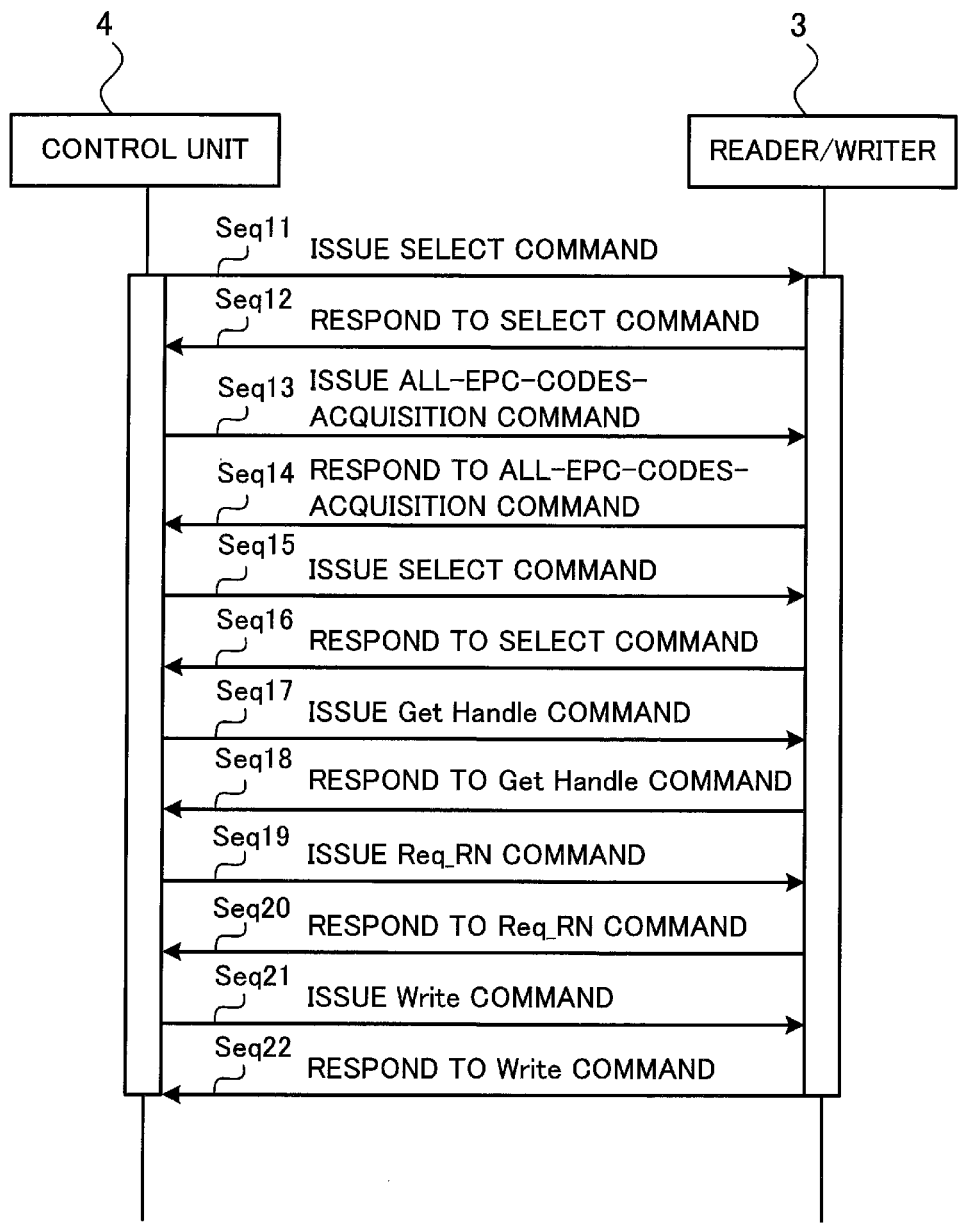
FIG. 8 is a sequence chart illustrating a procedure of the control unit when writing data to the RFID tag.

FIG. 8 is a sequence chart illustrating a procedure of the control unit when writing data to an RFID tag.

[Sequence Seq11] The control unit 4 issues, to the reader/writer 3, a select command for identifying the RFID tag 11 to be written.

[Sequence Seq12] The reader/writer 3 responds to the control unit 4 in response to the select command.

[Sequence Seq13] The control unit 4 issues an all-EPC-codes-acquisition command to the reader/writer 3.

[Sequence Seq14] In response to the all-EPC-codes-acquisition command, the reader/writer 3 causes each of the multi-filler helical antennas 22 to generate an electric field. The reader/writer 3 then returns identification information of all the RFID tags 11 read by each of the multi-filler helical antennas 22 to the control unit 4.

[Sequence Seq15] The control unit 4 issues, to the reader/writer 3, a select command for specifying identification information of an REID tag 11 to be written, from the identification information of the RFID tags 11 received in the sequence Seq14.

[Sequence Seq16] The reader/writer 3 responds to the control unit 4 with the RFID tag 11 according to the select command.

[Sequence Seq17] The control unit 4 issues, to the reader/writer 3, a Get Handle command for specifying a Handle of the RFID tag 11 specified in the sequence Seq15.

[Sequence Seg18] In response to the Get Handle command, the reader/writer 3 identifies a Handle in the RFID tag 11 specified in the sequence Seq15. The reader/writer 3 then returns the identified Handle to the control unit 4.

[Sequence Seg19] The control unit 4 issues a Req_RN command to the reader/writer 3. The Req_RN command is a command requesting, for example, a 16-bit random number which is used when the reader/writer 3 and the RFID tag 11 communicate with each other by exchanging encrypted messages.

[Sequence Seq20] The reader/writer 3 generates a random number in response to the Req_RN command. The reader/writer 3 then returns the generated random number to the control unit 4.

[Sequence Seq21] The control unit 4 issues, to the reader/writer 3, a Write command requesting the reader/writer 3 to perform writing to the RFID tag 11 using the random number.

[Sequence Seq22] The reader/writer 3 writes information into the RFID tag 11 in response to the Write command. Upon completion of information writing into the RFID tag 11, the reader/writer 3 returns notification of completion of writing to the control unit 4.

According to the tag access apparatus 1, as has been described above, using the multi-filler helical antenna 22 to access the RFID tag 11 makes it possible to keep the electric field strength at the antenna center higher than when accessing the RFID tag 11 using a patch antenna or the like. Therefore, the RFID tag 11 may be accessed more reliably.

In addition, the tag access antenna unit 2 and the sample rack 12 need not be moved at the time of access to the RFID tag 11. Therefore, it is possible to reduce the number of processes at the time of tag access, and to suppress the cost of the tag access apparatus. It is also possible to suppress electric power consumption accompanied with movement of the tag access antenna unit 2 and the sample rack 12.

In addition, the tag access apparatus 1 is able to access the RFID tags 11 individually, not the sample rack 12 as a whole, which allows access to a more specific thing.

Although a case of accessing the RFID tag 11 from under the sample rack 12 using the tag access antenna unit 2 has been described as an example in the present embodiment, this is not intended to be restrictive and the RFID tag 11 may be accessed from above the sample rack 12, or from both sides or one side thereof.

In addition, although an example of attaching the RFID tag 11 to the test tube 10 has been described in the present embodiment, it is needless to say that the object to which the RFID tag 11 is attached is not limited to the test tube 10.

Next, an exemplary use of the tag access apparatus 1 of the embodiment will be described, with blood drawing taken as an example.

Figure 9:
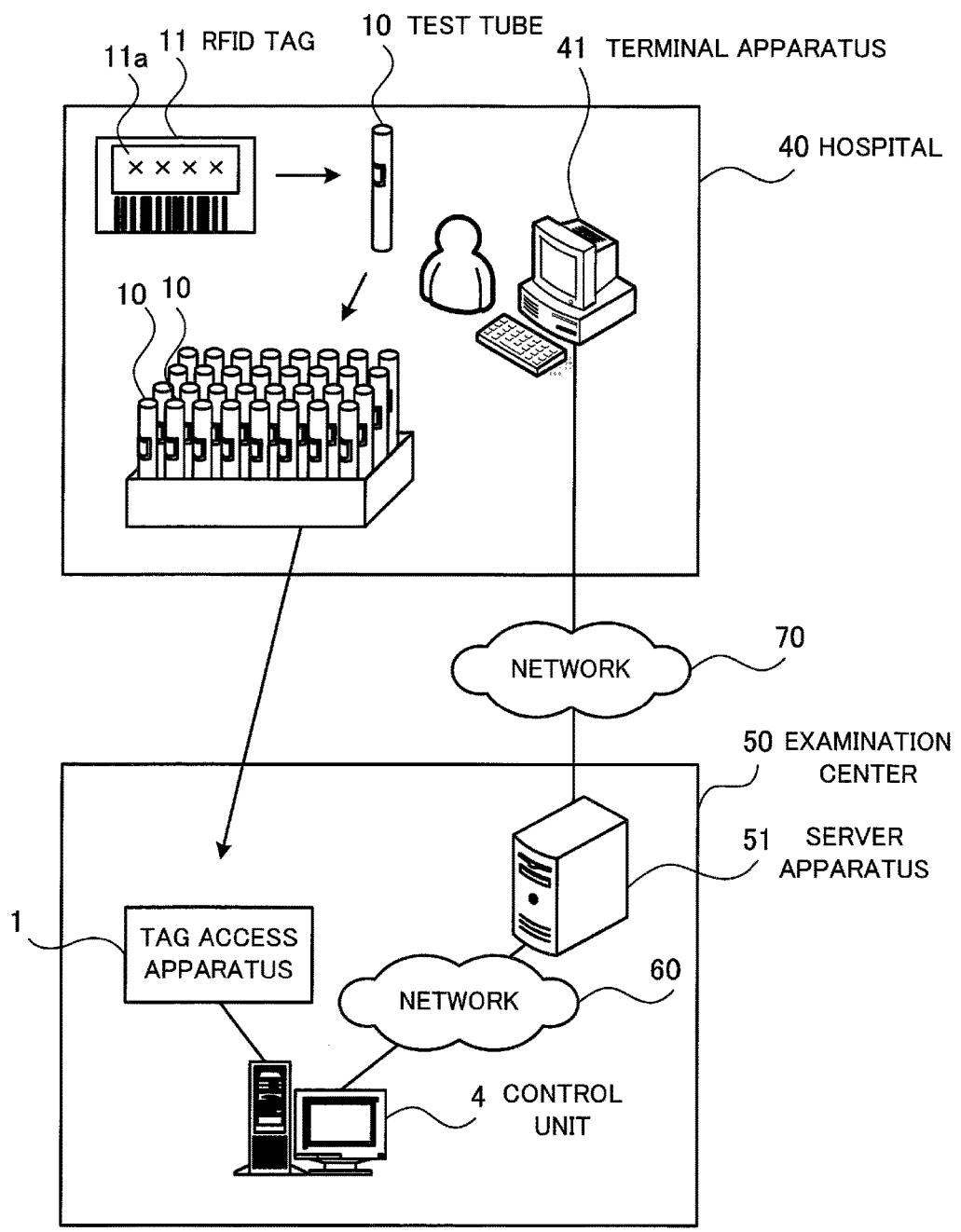
FIG. 9 is an explanatory diagram of an exemplary use of the tag access apparatus of the embodiment.

FIG. 9 is an explanatory diagram of an exemplary use of the tag access apparatus of the embodiment.

It is assumed in the exemplary use that a hospital 40 where blood drawing is performed is located far from an examination center 50 where the tag access apparatus 1 is installed.

First, a doctor or a nurse in the hospital 40 prepares the RFID tag 11 in which a bar-code, a visible unique number or the like is set. The bar-code or the visible unique number may be omitted.

Each time drawing blood from a blood donor, the doctor or the nurse attaches the RFID tag 11 to the test tube 10 containing the drawn blood. The doctor or the nurse then inputs, to a terminal apparatus 41, examination data in which a number 11a preliminarily set to the RFID tag 11 is associated with examination items of the drawn blood. Subsequently, the doctor or the nurse operates the terminal apparatus 41 to transmit the examination data to a server apparatus 51 installed in the examination center 50 via a network 70 such as a LAN (Local Area Network). Although a single hospital 40 is illustrated in FIG. 9, examination data may be sent to the server apparatus 51 from a plurality of hospitals.

The server apparatus 51 is connected to the control unit 4 via the network 60. The server apparatus 51 stores the examination data sent from the terminal apparatus 41 in an HDD or the like of the server apparatus 51. Upon receiving from the hospital 40 a plurality of test tubes 10 containing the drawn blood and having the RFID tags 11 attached thereto, the user of the control unit 4 operates the control unit 4 and thereby causes the control unit 4 to operate the tag access apparatus 1 and to read information stored in each of the RFID tags 11. Subsequently, the user operates the control unit 4 and causes the control unit 4 to identify examination items that respectively match the RFID tags 11 which have been read, from the examination data stored in the HDD or the like of server apparatus 51. The method of performing the procedure illustrated in FIG. 9 makes it possible to identify examination items associated with a plurality of test tubes 10 faster and more accurately than other methods such as a method of identifying examination items using a bar-code or the like. Therefore, it is possible to achieve improvement in efficiency of identifying examination items.

Although a tag access apparatus of the present invention has been described above on the basis of the illustrated embodiments, the invention is not limited thereto and the configuration of each part may be substituted by any configuration having a similar function. In addition, any other components or processes may be added to the invention.

Improvement in accuracy in reading and writing of a tag may be achieved, which allows collective reading from a large number of tags.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A tag access apparatus comprising:
 a plurality of second antennas each having a radiation surface which radiates radio waves and is opposite to bottom surfaces of a plurality of containers arranged at predetermined intervals,
 wherein the plurality of containers are test tubes,
 wherein each of the plurality of second antenna accesses an RFID tag which is provided on a side surface of each of the plurality of containers and which is provided with a first antenna arranged so as to have a radio wave directivity in a vertical direction with respect to the bottom surfaces of the containers,
 wherein the radiation surfaces are each positioned to face a direction of the radio wave directivity of the first antenna, are located at regular intervals so that electric fields generated by the second antennas overlap with each other, and each maintain an electric field strength at a central part of the each of the radiation surfaces at a level that allows access to the RFID tag, at the time of access to the RFID tag, and
 wherein a plurality of RFID tags is collectively read.

2. The tag access apparatus according to claim 1, wherein the second antenna is a multi-filler helical antenna.

3. The tag access apparatus according to claim 1, wherein a radio wave frequency between the first antenna and the second antenna is a UHF band.

4. The tag access apparatus according to claim 1, wherein the RFID tag of the container containing a sample is read.

5. The tag access apparatus according to claim 1, wherein a radio wave absorber is disposed at a position opposite to the first antenna across the second antenna.

\* \* \* \* \*